US006218964B1

(12) United States Patent
Ellis (10) Patent No.: US 6,218,964 B1
(45) Date of Patent: Apr. 17, 2001

(54) MECHANICAL AND DIGITAL READING PEN

(76) Inventor: Christ G. Ellis, 4705 Lakeland Ave., Minneapolis, MN (US) 55429

( * ) Notice: Subject to any disclaimer, the term of this patent is extended or adjusted under 35 U.S.C. 154(b) by 0 days.

(21) Appl. No.: 09/426,480

(22) Filed: Oct. 26, 1999

Related U.S. Application Data

(63) Continuation-in-part of application No. 08/936,640, filed on Sep. 24, 1997, now Pat. No. 5,973,618
(60) Provisional application No. 60/026,919, filed on Sep. 25, 1996.

(51) Int. Cl.[7] .................................................. G08G 1/123
(52) U.S. Cl. ...................... 340/990; 382/313; 178/18.01; 178/19.01; 235/472.01
(58) Field of Search ............................ 340/990; 345/180, 345/183; 178/18.01, 19.01; 235/472.01; 382/313, 314; 250/566

(56) References Cited

U.S. PATENT DOCUMENTS

| | | | |
|---|---|---|---|
| 4,158,194 | * | 6/1979 | McWaters et al. ........... 340/146.354 |
| 4,431,870 | * | 2/1984 | May et al. ......................... 179/81 C |
| 5,142,161 | * | 8/1992 | Brackmann .................... 235/472.01 |
| 5,294,792 | * | 3/1994 | Lewis et al. ......................... 250/221 |
| 5,574,804 | * | 11/1996 | Olschafskie et al. ................. 382/313 |
| 5,850,058 | * | 12/1998 | Tano et al. ......................... 178/18.01 |
| 5,852,434 | * | 12/1998 | Sekendur ........................... 178/18.01 |
| 5,866,856 | * | 2/1999 | Holtzman .......................... 178/19.01 |
| 5,895,906 | * | 4/1999 | Danielson et al. .............. 235/472.01 |
| 5,898,162 | * | 4/1999 | Koenck et al. .................. 235/472.01 |
| 5,955,719 | * | 9/1999 | Southworth et al. ................ 382/313 |

OTHER PUBLICATIONS

Wizcom Technologies, "Quicktionary," (Three pages printed out from the web site www.quicktionary.com), Wizcom Technologies (Jerusalem, Israel), (Sep. 4, 1999).

* cited by examiner

Primary Examiner—Benjamin C. Lee
Assistant Examiner—John Tweel, Jr.

(57) ABSTRACT

A reading pen (or input and output hand held device) that includes both digital and mechanical features. Digital features include a scanner for scanning printed information, including "selecting" information, pictures, etc., for color and/or patterns, a microphone for receiving dictated information, a digitizer for digitizing the scanned and dictated information, a computer processor, a storage, a visual display (or visual output), a printer, and a speaker (or audible output). Mechanical features include a lens for magnifying the printed information being scanned and a marking or coloring instrument such as a highlighter for marking the printed information being scanned. One simple electrical feature is a light for illuminating the printed information being scanned.

15 Claims, 5 Drawing Sheets

MECHANICAL AND DIGITAL READING PEN

This application is a C-I-P of U.S. patent application Ser. No. 08/936,640 filed Sep. 24, 1997 (U.S. Pat. No. 5,973,618 issued Oct. 26, 1999), which in turn claimed the benefit under Title 35, United States Code § 119(e) of U.S. Provisional Patent Application No. 60/026,919 filed Sep. 25, 1996 and entitled Control Avoidance, Traffic Control, Safety, And Information Systems.

BACKGROUND OF THE INVENTION

The present invention relates generally to a "reading pen" that has both mechanical and digital functions. As to digital functions, the reading pen scans, digitizes, stores, and/or reads back instantaneously desired text, data, pictures, graphics and other material. As to mechanical functions, the reading pen may highlight (color) and magnify text, data, pictures, graphics and other material. As to simple electrical functions, the reading pen includes a light to illuminate the material being scanned.

SUMMARY OF THE INVENTION

A feature of the present invention is a reading pen. The present reading pen is, generally, a hand held instrument that scans information (such as printed material) so as to convert the printed material into digitized information, and then instantaneously or at a later time "reads back" (through a speaker or through a printer that prints) the scanned information.

Another feature of the present invention is a reading that includes both digital functions such as scanning and mechanical functions such as highlighting (coloring the printed matter which has been scanned), illuminating and magnifying the printed matter.

Another feature of the present invention is a reading pen that scans, digitizes, and stores a variety of printed matter, including text data, pictures and graphics.

Another feature of the present invention is a reading pen that includes a microphone for receiving dictated information.

Another feature of the present invention is a reading pen with a reverse mode so as to rescan or redictate information.

Another feature of the present invention is a reading pen that includes a hard disk or diskette that stores images or other information for further processing such as being printed.

Another feature of the invention is a reading pen that may be powered by a variety of power sources, such as being electrically powered from a wall outlet, being powered by a battery, or being solar powered.

Another feature of the invention is a reading pen that can scan a relatively wide area or a relatively narrow area.

Another feature of the invention is a reading pen with functions that are independent of the other such that certain functions or parts of the reading pen may be turned on and certain other functions or parts of the reading pen may be turned off.

Another feature of the invention is a reading pen that is tied to a monitor or printer such that the scanned information can be electronically magnified for reading or printed. The tie to the monitor or printer may be by a conventional electric wire connection or by a wireless mechanism such as by infrared communication.

Another feature of the invention is a computer telephony system that includes a reading pen.

These and further objects and advantages of the present invention will become clearer in light of the following detailed description of the illustrative embodiments of this invention described in connection with the drawings.

DESCRIPTION

Figure 1A:
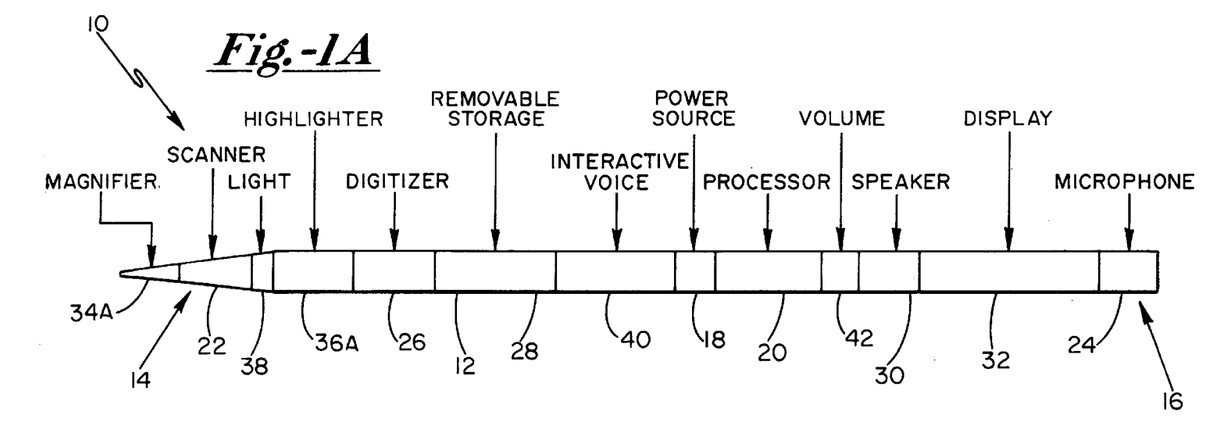
FIG. 1A is a side diagrammatic view of one embodiment of the reading pen.

As shown in FIG. 1A, a reading pen 10 includes a housing 12 with a proximal end portion 14 for being disposed adjacent to the printed information and a distal end portion 16 opposite of the proximal end portion 14. The reading pen 10 includes a power source 18 in the housing 12; a computer processor 20 in the housing 12 and that is in communication with the power source 18; a scanner 22 on the proximal end portion 14 of the housing 12 for scanning printed information, with the scanner 22 being in communication with the computer processor 20 and power source 18; a microphone 24 on the housing 12 for receiving audible information, with the microphone 24 being in communication with the computer processor 20 and power source 18; a digitizer 26 in the housing 12 and being in communication with the scanner 22 and microphone 24, with the digitizer 26 digitizing the printed information received by the scanner 22 and further digitizing the audible information received by the microphone 24, with the digitizer 26 further being in communication with the computer processor 20 and power source 18; a storage 28 in the housing 12 for storing the digitized information, with the storage 28 being in communication with the computer processor 20 and the power source 18; a speaker 30 on the housing 12, with the speaker 30 being in communication with the computer processor 20 and power source 18, with the speaker 30 further being in communication with the storage 28 and digitizer 26 such that an audible signal may be generated from the digitized information so as to read back the printed information, through, for example, computer telephony, that has been received by the scanner 22 and/or microphone 24; a visual display 32 on the housing 12, with the visual display 32 being in communication with the computer processor 20 and power source 18, with the visual display 32 further being in communication with the storage 28 and digitizer 26 such that a visual signal may be generated from the digitized information so as to display back the printed information that has been received by the scanner 22 and/or microphone 24; a lens 34A engaged with the housing 12 for magnifying the printed information being scanned; a marking instrument 36A on the proximal end portion 14 of the housing 12 to physically mark the printed information being scanned; and a light 38 on the proximal end portion 14 of the housing 12 to illuminate the printed information being scanned. The reading pen 10 further includes a digitized software package 40 such as interactive voice or integrated voice response in the housing 10, with the software 40 being in communication with the processor 20 and power source 18. The reading pen 10 further includes a volume control 42 for the speaker 30.

Figure 1B:
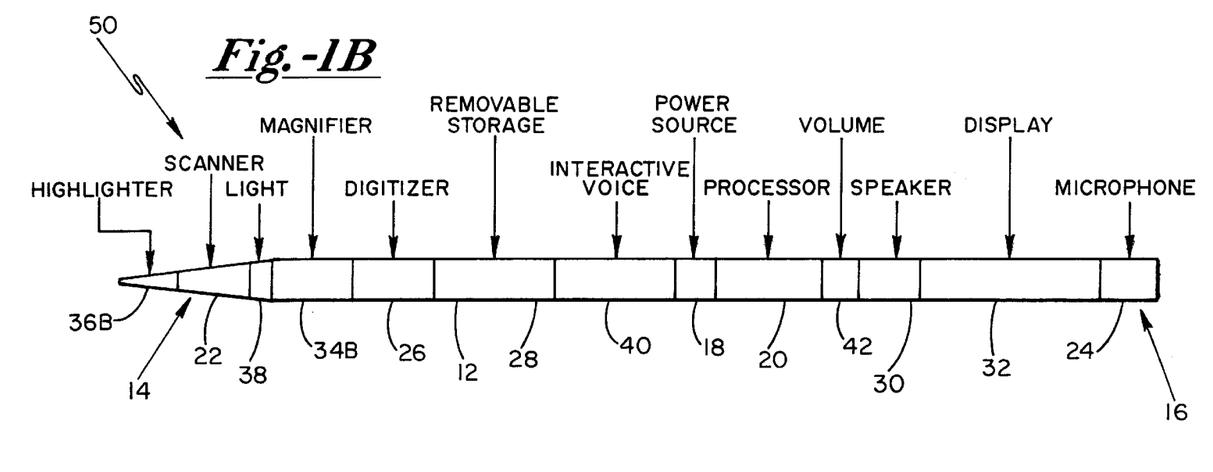
FIG. 1B is a side diagrammatic view of another embodiment of the reading pen.

FIG. 1B shows a reading pen 50 that is identical to the reading pen 10 of FIG. 1A except that the lens (magnifier) 34B and marking instrument 36B (highlighter) have switched positions and have different structures.

Figure 2A:
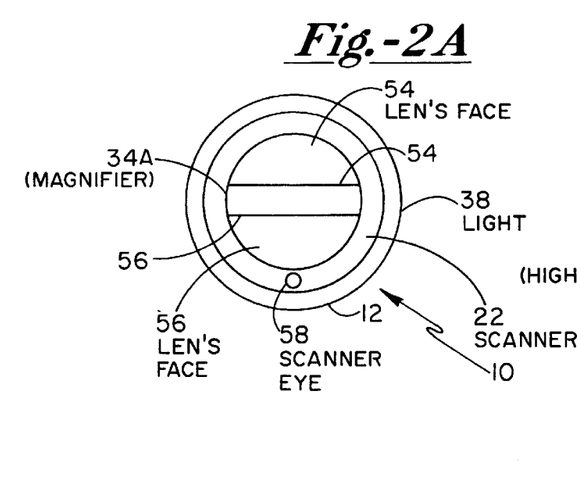
FIG. 2A is a proximal or bottom end diagrammatic view of the reading pen of FIG. 1A.

As shown in FIG. 2A, lens 34A is fixed to the scanner 22 where a line of sight travels through opposing faces 54 and 56 of the lens 34A. A scanner eye 58 is disposed adjacent to face 56 of the lens 34A so that the printed matter being magnified is the printed matter being scanned.

Figure 2B:
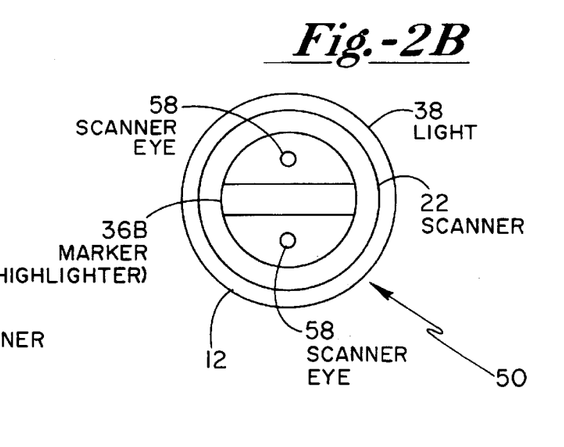
FIG. 2B is a proximal or bottom end diagrammatic view of the reading pen of FIG. 1B.

As shown in FIG. 2B, marker 36B (or marking instrument or highlighter) extends from the scanner 22 and includes a wick having a color such as a fluorescent yellow or pink embedded therein. As shown in FIG. 2B, a scanner eye 58 may be disposed on either or both sides of the marker 36B.

Figure 3A:
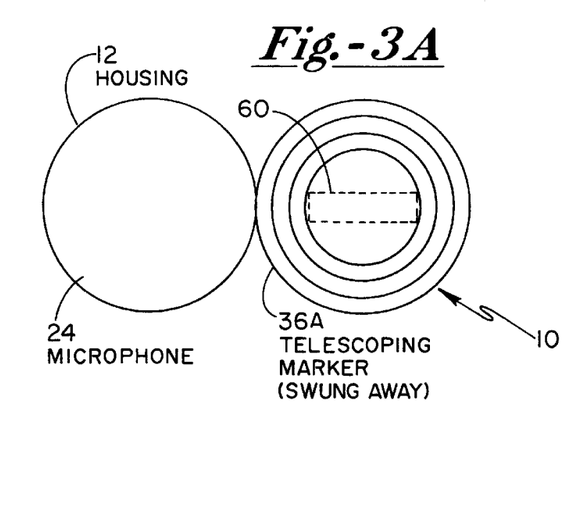
FIG. 3A is a distal or top end diagrammatic view of the reading pen of FIG. 1A.

As shown in FIG. 3A, telescoping marker 36A swings into and out of the housing 12 via a hinge. When swung out of the housing 12, marker 36A (or marking instrument or higlighter) is extended in length via a telescoping structure so that the marker 36A can extend to a position adjacent to or longitudinally beyond the scanner 22 and lens 34A so that a line of text may be efficiently magnified, scanned and highlighted in one linear stroke with the proximal end 14 of the reading pen 10. A wick 60 having a colored ink such as a fluorescent yellow or pink is shown in phantom in FIG. 3A.

Figure 3B:
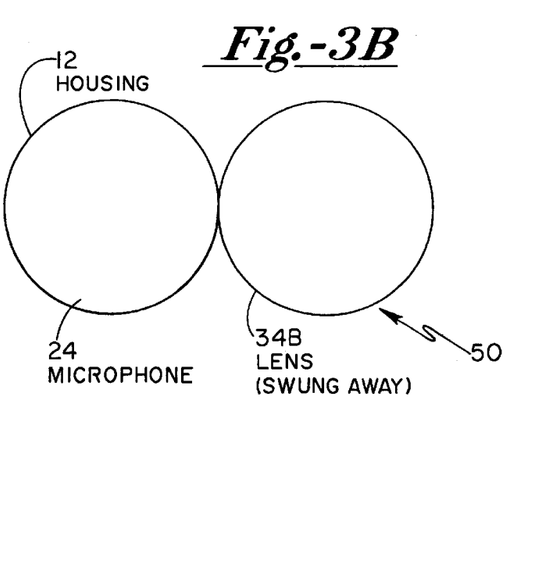
FIG. 3B is a distal or top end diagrammatic view of the reading pen of FIG. 1B.

As shown in FIG. 3B, a lens 34B swings into and out of the housing 12 via a hinge. The lens 34B includes a preset focus determined by the distance between the focal point of the lens 34B and a point just beyond the tip of the marker 36B so that the lens 34B remains in focus when the marker 36B is capped.

Figure 4A:
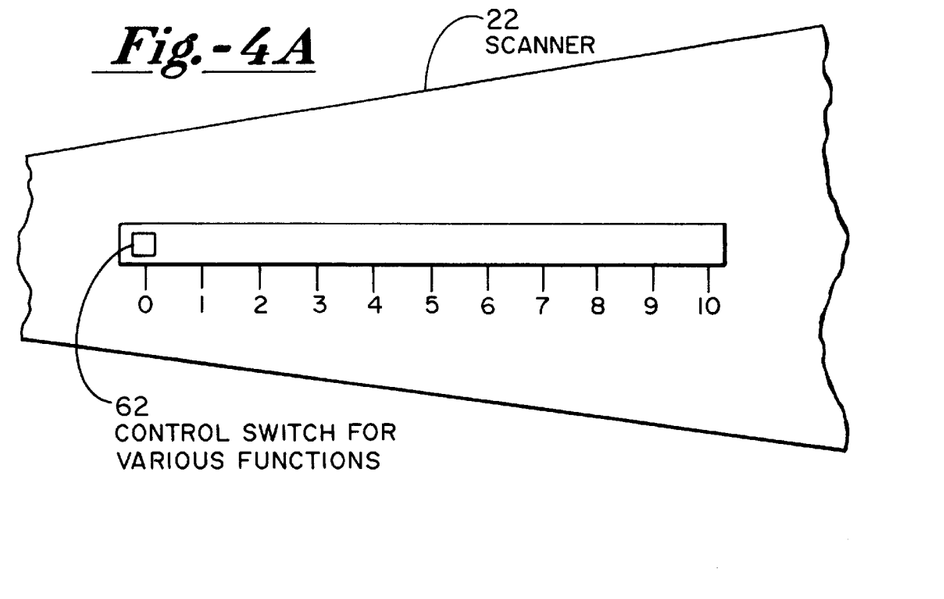
FIG. 4A is a side diagrammatic view of the scanner portion of the reading pen of each of FIGS. 1A and 1B showing a switch on the scanner portion for control of various functions of the reading pen.
Figure 4B:
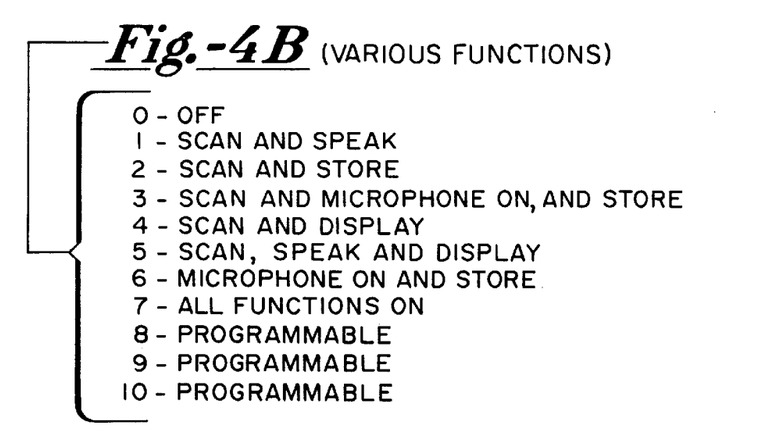
FIG. 4B is a listing of the various functions for the control switch shown in FIG. 4A.

As shown in FIG. 4A, a control switch 62 on the scanner 22 includes a number of positions for various functions. Some preferred functions are shown in FIG. 4B. A position "0" is an off position where power to all parts of the reading pen 10 may be cut off.

Position "1" closes internal switches to the scanner 22 and speaker 30. Position "1" is where printed information is scanned, digitized, processed and reproduced as a voice so that the reading pen 10 effectively reads (or is voicing) the printed information.

Position "2" closes internal switches to the scanner 22 and storage 28. Position "2" is where printed information is scanned, digitized, processed and stored (for later downloading or reading (i.e. voicing via the speaker)).

Position "3" closes internal switches to the scanner 22, microphone 24 and storage 28. Position "3" is where printed information is scanned, digitized, processed, and stored, and where dictated (audible information voiced by a human) information may be received by the microphone, digitized, processed, and stored.

Position "4" closes internal switches to the scanner 22 and display 32. Position "4" is where printed information is scanned, digitized, processed, and displayed in the visual display 32 in the same form as the printed information or in some other printed form as converted by the processor 20.

Position "5" closes internal switches to the scanner 22, speaker 30, and display 32. Position "5" is where printed information is scanned, digitized, processed and reproduced as a voice so that the reading pen 10 effectively reads (or is voicing) the printed information and where such printed information is at the same time is being displayed in the visual display 32 in the same form as the printed information or in some other printed form as converted by the processor 20.

Position "6" closes internal switches to the microphone 24 and storage 28. Position "6" is where audible information (for example dictated information by a human voice) may be fed into the microphone 24, digitized, processed, and stored in memory.

Position "7" closes all internal switches such that all functions of the reading pen may be on and operational.

Each of positions "8, 9, and 10" may be programmable so as to customize various combinations of functions.

Figure 5:
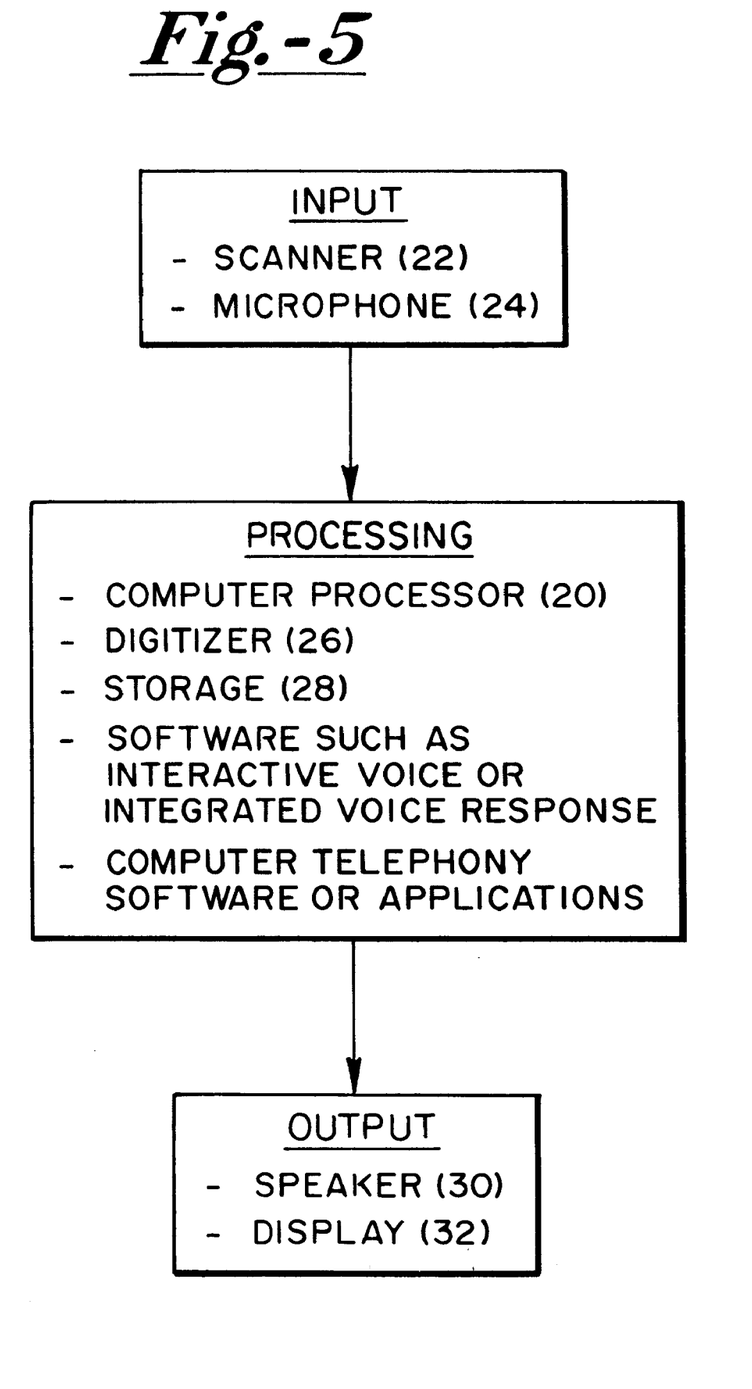
FIG. 5 is a schematic view showing the input functions, the processing function and related processing functions, and output functions.

FIG. 5 shows that there are generally two inputs to the reading pen 10, with these two inputs being the scanner 22 for scanning printed information and the microphone 24 for receiving audible information from sources such as the human voice. However, it should be noted that other inputs are possible with a reading pen 10. These inputs may include electronic inputs (such as where the reading pen has a plug in receptor or wireless receptors such as radio receptors) and inputs such as sensors such as temperature sensors. Another input is an electronic eye for video input.

FIG. 5 further shows that there are generally two outputs for the reading pen 10, with these two outputs being the speaker 30 and display 32. However, it should be noted that other outputs are available. These outputs may include peripheral outputs such as to other computers (for example larger more powerful computers), desk top monitors, printers where the information stored in storage 28 may be downloaded and printed, warning devices that are monitored by third parties such as the police. Electrical wires or wireless mechanisms such as radio or infrared mechanisms may permit communication between the reading pen 10 and the peripheral device or peripheral output.

FIG. 5 further shows that the computer processor 20, digitizer 26, storage medium 28, and software are in communication with each other and is generally a black box that may be customized by the end user. For example, foreign language software may be downloaded into the reading pen 10 such that, when printed matter of one language is scanned, another language is voiced by the speaker 30. Still further, computer telephony software or applications can be downloaded into the reading pen 10 so that the pen 10 may cooperate with and communicate with computer telephony applications, devices, platforms or systems.

Figure 6:
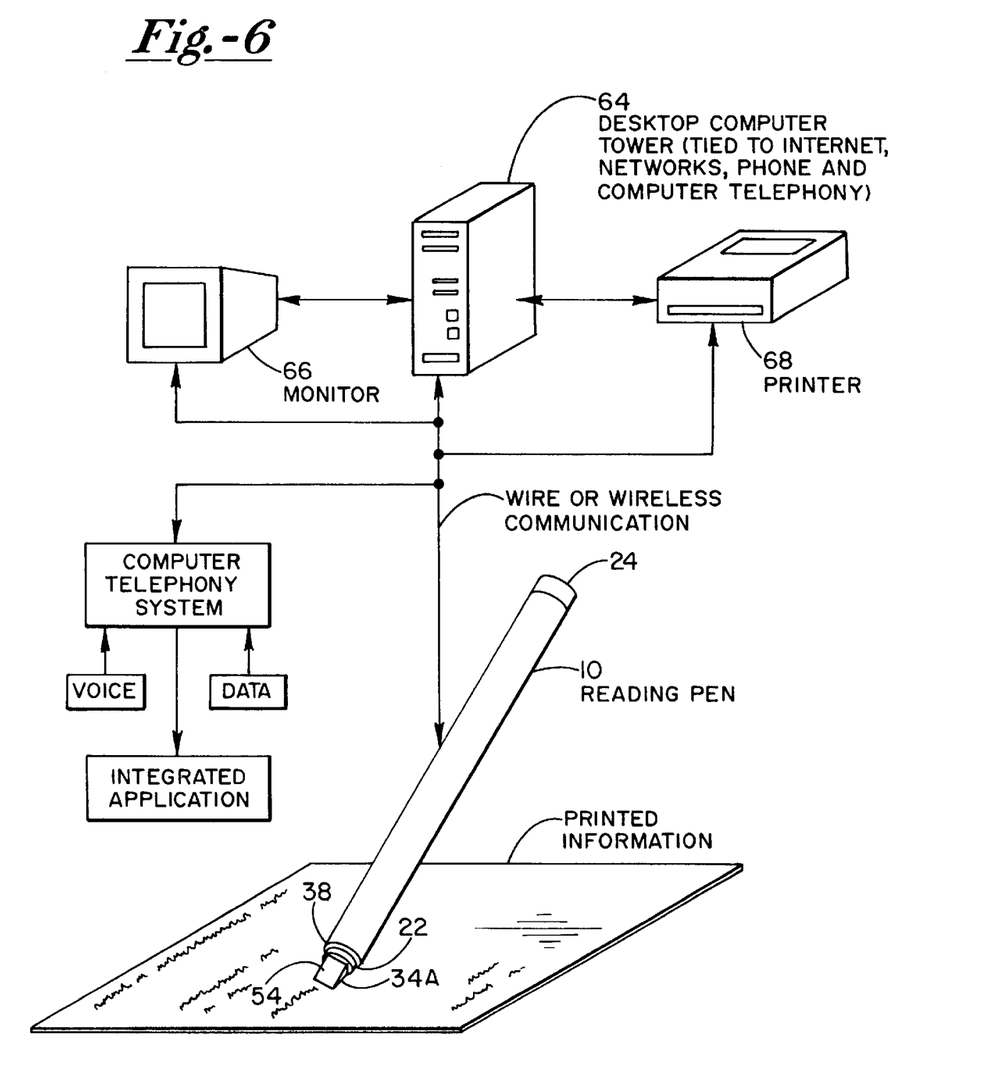
FIG. 6 shows a schematic, somewhat perspective view of the reading pen of the present invention scanning printed information while being in communication with and enjoying the benefits of a desktop computer, monitor, printer, and, through the desktop computer, being tied to and enjoying the benefits of the Internet, networks, phone systems, and computer telephony).

FIG. 6 shows that the reading pen 10 (or 50) may communicate with a desktop computer 64 directly, with a monitor 66 directly, and with a printer 68 directly because the reading pen has a processor 20. However, if desired, the reading pen 10 (or 50) may communicate with the desktop computer 64 which in turn may communicate with the monitor 66 and printer 68.

FIG. 6 further shows that the reading pen may be in communication with, enjoy the benefits of, and contribute to the Internet, networks, the phone system, and computer telephony systems. In other words, the reading pens 10 and 50 may receive inputs from and transmit outputs to the Internet, networks, the phone system and computer telephony systems. Further or alternatively, reading pens 10 and 50 may be in direct communication with a computer telephony system 70. As to computer telephony and computer telephony systems and applications, the book *Computer Telephony And Wireless Technologies: Future Directions In Communications*, authored by and published by the Computer Technology Research Corporation of Charleston, S.C. (1997) is hereby incorporated by reference in its entirety. An out of date definition of computer telephony is the integration of a computer system with a telephone system. However, the definition accepted at present is that computer telephony is a platform or system that merges voice and data services in order to enable the development of integrated business applications. This latter definition is the definition applied herein.

Computer telephony further provides or performs the following functions: telephone, voicemail, interactive voice response, audible/visible e-mail, audible/visible fax, data/voice integration, personal computer based call processing. In computer telephony systems, database messages are subject to a pattern-matching rules engine that assigns messages to categories and to the proper expertise groups, attaching the suggested responses. A response is then produced (or perhaps a collaborative response is crafted). In computer telephony systems, a transducer is actuated by power from one system and supplies power to a second system (for example, a loudspeaker transforms electrical signals into sound energy). In computer telephony, a telephone functions as an easy-to-use terminal.

The Housing 12

The housing 12 is preferably formed of a lightweight metal. Housing 12 may be formed in the sections as shown in FIGS. 1A and 1B, with pin and socket connections engaging each of the sections together such that the sections may interact and communicate with each other. For example, one end of the section for display 32 may have pins (for connection to the section for the microphone 24) and the other end may have sockets (for connection to the section for the speaker 30).

Housing 12 or particular housing sections may have openings. For example, processor 20 may have a closeable opening for inserting and removing a hard disk or a diskette. Further by way of example, the section for storage 28 may have an opening for removing storage medium (that may be downloaded and printed elsewhere). Still further by way of example, the section for power source 18 may include an opening for inserting and removing batteries.

The length of the reading pen 10 is preferably about the length of a conventional pen or pencil, i.e., between about six and eight inches. The diameter of the reading pen 10 may be larger than that shown in FIGS. 1A and 1B. The diameter of the reading pen 10 may be determined by the diameter of the disk drive. Currently, disk drives in the range of about 45 mm to about 80 mm are being produced.

The Power Source 18

The power source 18 is preferably battery powered. However, solar cells may be affixed over portions of the housing 12.

The Computer Processor 20, Digitizer 26, Storage 28, Display 32 Power Source 18

The present invention may use many of the components of personal digital assistants (PDA) such as the Newton® manufactured by Apple. The present invention may rearrange such components to fit the shape of a pen. Accordingly, as to the computer processor 20, digitizer 26, storage 28, display 32, and power source 18, U.S. Pat. No. 5,835,732 entitled "Miniature Digital Assistant Having Enhanced Host Communication" that issued Nov. 10, 1998, is hereby incorporated by reference in its entirety. Of course, it should be noted that the inputs and outputs of the present reading pen 10 are different from personal digital assistants.

Further as to computer processors 20, it should be noted that larger, powerful computers may be used with the present reading pen 10 by providing a connection (either by wire or wireless technologies) between the pen 10 and such larger, more powerful computer (such as a desktop computer). As to wireless connections between pen-shaped objects and computers, U.S. Pat. No. 5,166,668 entitled Wireless Pen-type Input Device For Use With A Computer that issued Nov. 24, 1992 is hereby incorporated by reference in its entirety.

As to a hard disk for the reading pen 10, the following U.S. Pat. Nos. are hereby incorporated by reference in its entirety: U.S. Pat. No. 5,408,374 entitled Miniature Hard Disk Drive With Spin Motor For Portable Computer that issued Apr. 18, 1995 and U.S. Pat. No. 5,377,065 entitled Miniature Hard Disk Drive For Portable Computer Having A Rotary Inertial Latch For Disk Drive Actuator that issued Dec. 27, 1994.

The Scanner 22, Speaker 30, Display 32, Power Source 18

As to the scanner 22, speaker 30, display 32, and power source 18, scanners for reading text, graphics and other printed information such as bar codes are allegedly available for purchase. For example, the "Quicktionary" is marketed by Wizcom Technologies Ltd. of Jerusalem, Israel. The "Quicktionary" tool is a hand held tool for allegedly scanning a word in one language. The "Quicktionary" tool then allegedly converts the scanned information into an alleged voiced translation and an alleged displayed translation. The "Quicktionary" tool allegedly scans printed text, allegedly includes Text-To-Speech technology, allegedly includes a speaker for pronouncing the translated word, and further allegedly includes a display for displaying the translated word.

Further, a Key Tronic 1200 optical character recognition hand held wand and guide mask is allegedly available from Key Tronic of Spokane, Wash.

Further as to scanners 22, U.S. Pat. No. 5,932,860 entitled Light Beam Scanning Pen, Scan Module For The Device And Method of Utilization that issued Aug. 3, 1999 is hereby incorporated by reference in its entirety. This patent represents that its technology is a "high speed non-contact beam scanning device sized and shaped to provide the ergonomic benefits of a pen or wand, yet can scan a wide angle moving beam across an information-bearing target in one or two dimensional scan patterns such as lines, rasters or other patterns in order to read information therefrom" and that its device "is well suited for reading one or two dimensional bar-code or other printed matter."

The Microphone 24, Digitizer 26, Processor 20, and Storage 28

As to the microphone 24, digitizer 26, processor 20, and storage 28 (i.e. memory), U.S. Pat. No. 5,812,870 entitled Personal Organizer With Interface For Recording Digital Voice Files that issued Sep. 22, 1998 is hereby incorporated by reference in its entirety.

The Digitizer 26

As to the digitizer 26 and as to Text-To-Voice software or converters, the following U.S. Pat. Nos. are hereby incorporated by reference in their entireties: U.S. Pat. No. 5,803,901 entitled Text To Voice Apparatus Accessing Multiple Gazetteers Dependent Upon Vehicular Position that issued Apr. 13, 1999, U.S. Pat. No. 5,850,629 entitled User Interface Controller For Text-To-Speech Synthesizer that issued Dec. 15, 1998.

The Display 32

As to the display 32, U.S. Pat. No. 5,821,911 entitled Miniature Virtual Image Color Display that issued Oct. 13, 1998 is hereby incorporated by reference in its entirety.

Thus since the invention disclosed herein may be embodied in other specific forms without departing from the spirit or general characteristics thereof some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A reading pen for reading printed information, comprising:
    a) a housing including a proximal end portion for being disposed adjacent to the printed information and further including a distal end portion opposite of the proximal end portion;
    b) a power source in the housing;
    c) a computer processor in the housing and being in communication with the power source;
    d) a scanner on the proximal end portion of the housing for scanning printed information, with the scanner being in communication with the computer processor and power source;
    e) a microphone on the housing for receiving audible information, with the microphone being in communication with the computer processor and power source;
    f) a digitizer in the housing and being in communication with the scanner and microphone, with the digitizer digitizing the printed information received by the scanner and further digitizing the audible information received by the microphone, with the digitizer further being in communication with the computer processor and power source;
    g) a storage in the housing for storing the digitized information, with the storage being in communication with the computer processor and the power source; and
    h) a speaker on the housing, with the speaker being in communication with the computer processor and power source, with the speaker further being in communication with the storage and digitizer wherein a voice via a text-to-voice converter may be generated from the digitized information so as to read back in said voice from the speaker the printed information that has been received by the scanner and wherein a voice may be generated from the digitized information so as to read back in said voice from the speaker the information that has been received by the microphone.

2. The reading pen of claim 1 and further comprising a lens engaged with the housing for magnifying the printed information being scanned, with the lens disposed to provide a line of sight of the printed information through the lens for a user.

3. The reading pen of claim 1 and further comprising a marking instrument on the proximal end portion of the housing to mark the printed information being scanned.

4. The reading pen of claim 1 and further comprising a light on the proximal end portion of the housing to illuminate the printed information being scanned.

5. The reading pen of claim 1 and further comprising a visual display on the housing, with the visual display being in communication with the computer processor and power source, with the visual display further being in communication with the storage and digitizer such that a visual signal may be generated from the digitized information so as to display back the printed information that has been received by at least one of the scanner and microphone.

6. The reading pen of claim 1 wherein the storage is removably engaged with the housing.

7. The reading pen of claim 1 wherein the computer processor includes software selected from the group consisting of integrated voice response software, interactive voice software, and computer telephony software.

8. The reading pen of claim 1 further comprising outside communication means for communicating with an electrical mechanism remote from the housing.

9. The reading pen of claim 8 wherein the outside communication means comprises a wire between the housing and the electrical mechanism.

10. The reading pen of claim 8 wherein the outside communication means comprises wireless means between the housing and the electrical mechanism.

11. The reading pen of claim 3 wherein the marking instrument comprises a coloring instrument.

12. The reading pen of claim 1 wherein the reading pen is in communication with a computer telephony system, wherein the computer telephony system comprises a platform that merges voice and data services in order to enable the development of integrated applications.

13. A reading pen for reading printed information, comprising:
    a) a housing including a proximal end portion for being disposed adjacent to the printed information and further including a distal end portion opposite of the proximal end portion;
    b) a power source in the housing;
    c) a computer processor in the housing and being in communication with the power source;
    d) a scanner on the proximal end portion of the housing for scanning printed information, with the scanner being in communication with the computer processor and power source;
    e) a microphone on the housing for receiving audible information, with the microphone being in communication with the computer processor and power source;
    f) a digitizer in the housing and being in communication with the scanner and microphone, with the digitizer digitizing the printed information received by the scanner and further digitizing the audible information received by the microphone, with the digitizer further being in communication with the computer processor and power source;
    g) a storage in the housing for storing the digitized information, with the storage being in communication with the computer processor and the power source;
    h) a speaker on the housing, with the speaker being in communication with the computer processor and power source, with the speaker further being in communication with the storage and digitizer wherein a voice via a text-to-voice converter may be generated from the digitized information so as to read back in said voice the printed information that has been received by the scanner and wherein a voice may be generated from the digitized information so as to read back in said voice information that has been received by the microphone;

i) a visual display on the housing, with the visual display being in communication with the computer processor and power source, with the visual display further being in communication with the storage and digitizer such that a visual signal may be generated from the digitized information so as to display back the printed information that has been received by at least one of the scanner and microphone;

j) a lens engaged with the housing for magnifying the printed information being scanned, with the lens disposed to provide a line of sight of the printed information through the lens for the user;

k) a marking instrument on the proximal end portion of the housing to physically mark the printed information being scanned; and l) a light on the proximal end portion of the housing to illuminate the printed information being scanned.

14. The reading pen of claim 13 wherein the marking instrument is a coloring instrument.

15. A computer telephony system in combination with a reading pen, wherein the computer telephony system comprises a platform that merges voice and data services in order to enable the development of integrated applications, and wherein the reading pen comprises:

a) a housing including a proximal end portion for being disposed adjacent to printed information and further including a distal end portion opposite of the proximal end portion;

b) a power source in the housing;

c) a computer processor in the housing and being in communication with the power source and the computer telephony system;

d) a scanner on the proximal end portion of the housing for scanning printed information, with the scanner being in communication with the computer processor and power source;

e) a microphone on the housing for receiving audible information, with the microphone being in communication with the computer processor and power source;

f) a digitizer in the housing and being in communication with the scanner and microphone, with the digitizer digitizing the printed information received by the scanner and further digitizing the audible information received by the microphone, with the digitizer further being in communication with the computer processor and power source;

g) a storage in the housing for storing the digitized information, with the storage being in communication with the computer processor and the power source; and h) a speaker on the housing, with the speaker being in communication with the computer processor and power source, with the speaker further being in communication with the storage and digitizer wherein a voice via a text-to-voice converter may be generated from the digitized information so as to read back in said voice the printed information that has been received by the scanner and wherein a voice may be generated from the digitized information so as to read back in said voice information that has been received by the microphone.

* * * * *